US012703387B2

(12) United States Patent
Inada

(10) Patent No.: US 12,703,387 B2
(45) Date of Patent: Aug. 11, 2026

(54) CONTROL APPARATUS, CONTROL METHOD, AND NON-TRANSITORY COMPUTER READABLE RECORDING MEDIUM

(71) Applicant: TOYOTA JIDOSHA KABUSHIKI KAISHA, Toyota (JP)

(72) Inventor: Junya Inada, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 6 days.

(21) Appl. No.: 18/753,593

(22) Filed: Jun. 25, 2024

(65) Prior Publication Data

US 2025/0002038 A1 Jan. 2, 2025

(30) Foreign Application Priority Data

Jun. 28, 2023 (JP) ................................ 2023-105731

(51) Int. Cl.
*B60W 60/00* (2020.01)
*B60W 50/04* (2006.01)
*B60W 50/14* (2020.01)

(52) U.S. Cl.
CPC .......... *B60W 60/001* (2020.02); *B60W 50/04* (2013.01); *B60W 50/14* (2013.01); *B60W 2420/40* (2013.01); *B60W 2555/00* (2020.02)

(58) Field of Classification Search
CPC ............. B60W 50/04; B60W 2420/40; B60W 2555/00; B60W 50/14; B60W 60/0053
See application file for complete search history.

(56) References Cited

U.S. PATENT DOCUMENTS

| | | | | |
|---|---|---|---|---|
| 9,489,635 | B1 * | 11/2016 | Zhu | G06V 10/987 |
| 10,457,294 | B1 | 10/2019 | Zhang et al. | |
| 11,904,890 | B2 * | 2/2024 | Zhu | B60W 60/0011 |
| 2018/0081359 | A1 | 3/2018 | Otaki et al. | |
| 2021/0101616 | A1 * | 4/2021 | Hayat | G06T 7/20 |
| 2021/0223780 | A1 * | 7/2021 | Bramley | G06N 3/04 |
| 2021/0398159 | A1 | 12/2021 | Nagasaka et al. | |

FOREIGN PATENT DOCUMENTS

| | | | |
|---|---|---|---|
| JP | 2017-162406 | A | 9/2017 |
| JP | 2018-165692 | A | 10/2018 |
| JP | 2020-004402 | A | 1/2020 |
| JP | 2021-195933 | A | 12/2021 |
| JP | 2022-007079 | A | 1/2022 |
| JP | 2022-067454 | A | 5/2022 |

* cited by examiner

*Primary Examiner* — Toya Pettiegrew
(74) *Attorney, Agent, or Firm* — Dinsmore & Shohl LLP

(57) ABSTRACT

A control apparatus for a vehicle comprises one or more processors configured to perform automated driving control of the vehicle by using a machine learning model. The control apparatus calculates a reliability regarding an inference result by the machine learning model while performing the automated driving control. When a first condition indicating that the reliability has decreased is met, the control apparatus performs notification for prompting an operator to check a driving environment of the vehicle. When a second condition indicating that the reliability has further decreased in addition to the first condition is met, the control apparatus performs notification for requesting hands-on to the operator.

6 Claims, 6 Drawing Sheets

CONTROL APPARATUS, CONTROL METHOD, AND NON-TRANSITORY COMPUTER READABLE RECORDING MEDIUM

CROSS-REFERENCE TO RELATED APPLICATION

The present disclosure claims priority to Japanese Patent Application No. 2023-105731, filed on Jun. 28, 2023, the contents of which application are incorporated herein by reference in their entirety.

TECHNICAL FIELD

The present disclosure relates to a technique for performing automated driving control of a vehicle using a machine learning model.

BACKGROUND ART

In recent years, various techniques have been proposed to utilize a machine learning model as artificial intelligence (AI) in the field of vehicle control.

For example, Patent Literature 1 discloses a vehicle control support system for supporting vehicle control using a machine learning model (learned model) that reflects the state of the vehicle, driver's intentions, and the like. In addition, the following Patent Literatures 2 and 3 are documents showing the technical level of the present technical field.

LIST OF RELATED ART

Patent Literature 1: JP 2022067454 A
Patent Literature 2: JP 2020004402 A
Patent Literature 3: JP 2021195933 A

SUMMARY

Among vehicle controls, especially automated driving control, it is expected that control performance will be improved by utilizing a machine learning model in each of the functions of recognition, judgement, and operation. In the automated driving control, it is required to appropriately determine whether the control can be continued normally. On the other hand, the inference result by the machine learning model has a probabilistic element. Therefore, when the automated driving control of the vehicle is performed using the machine learning model, it is considered that it will be difficult to determine whether the control can be continued normally.

In view of the above problem, an object of the present disclosure is to provide a technique that makes it possible to effectively monitor and operate automated driving control using a machine learning model.

A first aspect of the present disclosure is directed to a control apparatus for a vehicle.

The control apparatus comprises one or more processors configured to perform automated driving control of the vehicle by using a machine learning model.

The vehicle is configured to be drivable by an operator.

The one or more processors are further configured to execute:

- calculating a reliability regarding an inference result by the machine learning model while performing the automated driving control;
- when a first condition indicating that the reliability has decreased is met, performing notification for prompting the operator to check a driving environment of the vehicle; and
- when a second condition indicating that the reliability has further decreased in addition to the first condition is met, performing notification for requesting hands-on to the operator.

A second aspect of the present disclosure is directed to a control method for a vehicle configured to be drivable by an operator.

The control method includes:

- performing automated driving control of the vehicle by using a machine learning model;
- calculating a reliability regarding an inference result by the machine learning model while performing the automated driving control;
- when a first condition indicating that the reliability has decreased is met, performing notification for prompting the operator to check a driving environment of the vehicle; and
- when a second condition indicating that the reliability has further decreased in addition to the first condition is met, performing notification for requesting hands-on to the operator.

A second aspect of the present disclosure is directed to a control program for controlling a vehicle configured to be drivable by an operator.

The control program, when executed by a computer, causes the computer to execute:

- performing automated driving control of the vehicle by using a machine learning model;
- calculating a reliability regarding an inference result by the machine learning model while performing the automated driving control;
- when a first condition indicating that the reliability has decreased is met, performing notification for prompting the operator to check a driving environment of the vehicle; and
- when a second condition indicating that the reliability has further decreased in addition to the first condition is met, performing notification for requesting hands-on to the operator.

According to the present disclosure, the reliability regarding the inference result by the machine learning model is calculated while performing the automated driving control. The decrease in the reliability is evaluated in two stages: when the reliability satisfies the first condition, the notification for prompting the operator of the vehicle to check a driving environment; and when the reliability satisfies the second condition in addition to the first condition, the notification for requesting hands-on to the operator. It is thus possible to effectively monitor and operate the automated driving control using a machine learning model.

DETAILED DESCRIPTION

Hereinafter, embodiments will be described with reference to the drawings.

1. Automated Driving of Vehicle

Figure 1:
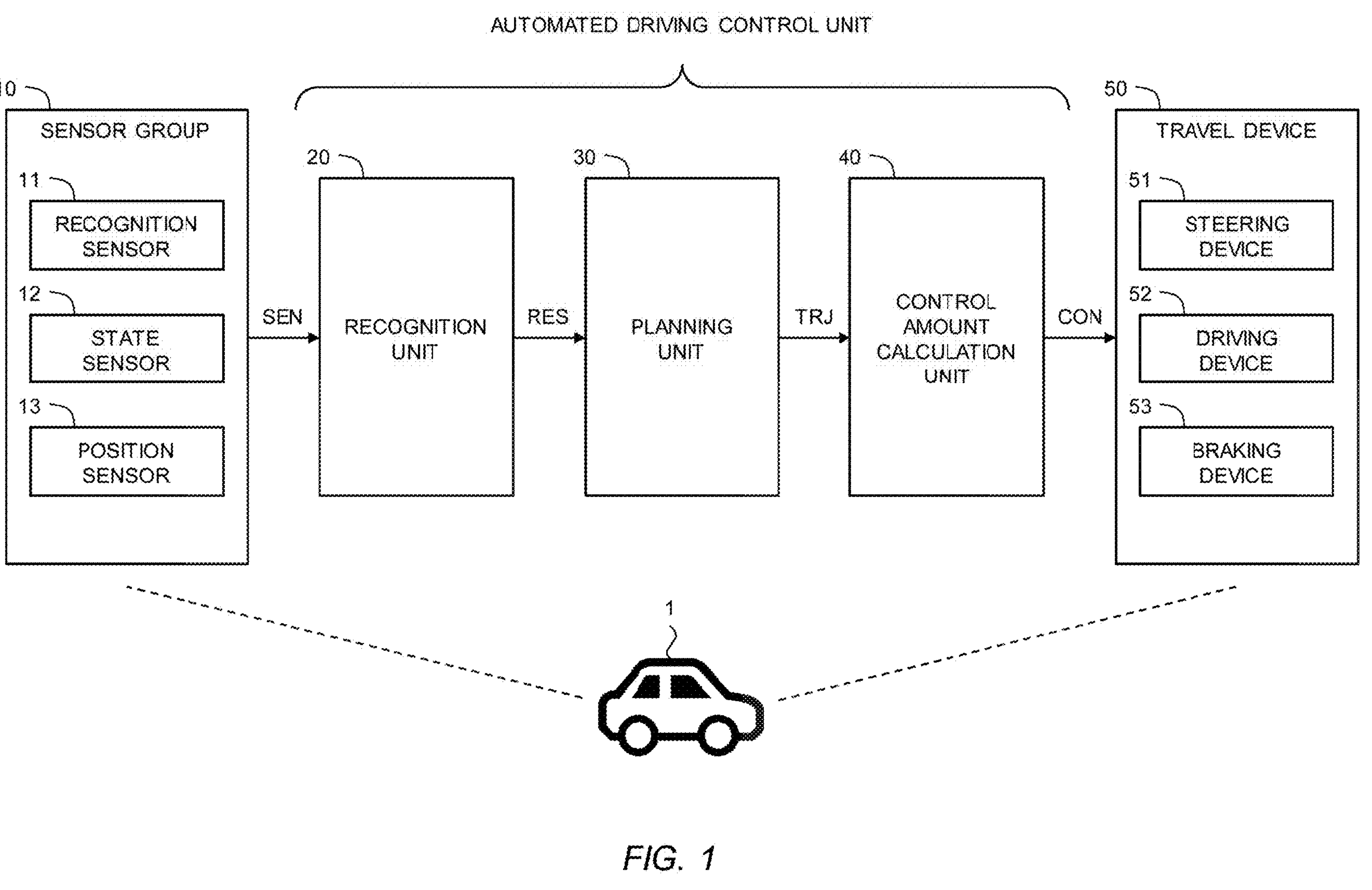
FIG. 1 is a diagram showing an example of a configuration related to an automated driving function of a vehicle according to the present embodiment.

The present embodiment relates to a control apparatus for a vehicle. The control apparatus according to the present embodiment performs at least automated driving control of the vehicle. FIG. 1 is a block diagram showing an example of a configuration related to automated driving control of a vehicle 1 by a control apparatus according to the present embodiment. The automated driving control is a concept including not only complete automated driving control but also risk avoidance control, lane keep assist control, and the like.

The vehicle 1 includes a sensor group 10, a recognition unit 20, a planning unit 30, a control amount calculation unit 40, and a travel device 50.

The sensor group 10 includes a recognition sensor 11 used for recognizing a situation around the vehicle 1. Examples of the recognition sensor 11 include a camera, a laser imaging detection and ranging (LIDAR), a radar, and the like. The sensor group 10 may further include a state sensor 12 that detects a state of the vehicle 1, a position sensor 13 that detects a position of the vehicle 1, and the like. Examples of the state sensor 12 include a speed sensor, an acceleration sensor, a yaw rate sensor, a steering angle sensor, and the like. As the position sensor 13, a global navigation satellite system (GNSS) sensor is exemplified.

Sensor detection information SEN is information acquired by the use of the sensor group 10. For example, the sensor detection information SEN includes an image captured (taken) by the camera. As another example, the sensor detection information SEN may include point group information acquired by the LIDAR. The sensor detection information SEN may include vehicle state information indicating the state of the vehicle 1. The sensor detection information SEN may include position information indicating the position of the vehicle 1.

The recognition unit 20 receives the sensor detection information SEN. The recognition unit 20 recognizes a situation around the vehicle 1 based on the information acquired by the recognition sensor 11. For example, the recognition unit 20 recognizes an object around the vehicle 1. Examples of the object include a pedestrian, another vehicle (e.g., a preceding vehicle, a parked vehicle, and the like), a white line, a road structure (e.g., a guard rail, a curb, and the like), a fallen object, a traffic light, an intersection, a sign, and the like. Recognition result information RES indicates a result of recognition by the recognition unit 20. For example, the recognition result information RES includes object information indicating a relative position and a relative speed of the object with respect to the vehicle 1.

The planning unit 30 receives the recognition result information RES from the recognition unit 20. In addition, the planning unit 30 may receive the vehicle state information, the position information, and map information generated in advance. The map information may be high-precision three-dimensional map information. The planning unit 30 generates a travel plan of the vehicle 1 based on the received information. The travel plan may be one for arriving at a destination set in advance. The travel plan may be one for avoiding a risk. Examples of the travel plan include maintaining a current travel lane, making a lane change, overtaking, making a right or left turn, steering, accelerating, decelerating, stopping, and the like. Further, the planning unit 30 generates a target trajectory TRJ required for the vehicle 1 to travel in accordance with the travel plan. The target trajectory TRJ includes a target position and a target velocity.

The control amount calculation unit 40 receives the target trajectory TRJ from the planning unit 30. The control amount calculation unit 40 calculates a control amount CON required for the vehicle 1 to follow the target trajectory TRJ. It can be also said that the control amount CON is a control amount required for reducing a deviation of the vehicle 1 from the target trajectory TRJ. The control amount CON includes at least one of a steering control amount, a driving control amount, and a braking control amount. Examples of the steering control amount include a target steering angle, a target steering torque, a target motor angle, a target motor drive current, and the like. Examples of the driving control amount include a target speed, a target acceleration, and the like. Examples of the braking control amount include a target speed, a target deceleration, and the like.

The travel device 50 includes a steering device 51, a driving device 52, and a braking device 53. The steering device 51 steers wheels of the vehicle 1. For example, the steering device 51 includes an electric power steering (EPS) device. The driving device 52 is a power source that generates a driving force. Examples of the driving device 52 include an engine, an electric motor, an in-wheel motor, and the like. The braking device 53 generates a braking force. The travel device 50 receives the control amount CON from the control amount calculation unit 40. The travel device 50 operates the steering device 51, the driving device 52, and the braking device 53 in accordance with the steering control amount, the driving control amount, and the braking control amount, respectively. Thus, the vehicle 1 travels so as to follow the target trajectory TRJ.

The recognition unit 20 includes at least one of a rule-based model and a machine learning model. The rule-based model performs the recognition process based on a predetermined rule group. Examples of the machine learning model include a neural network (NN), a support vector machine (SVM), a regression model, a decision tree model, and the like. The NN may be a convolutional neural network (CNN), a recurrent neural network (RNN), or a combination of CNN and RNN. The type of each layer, the number of layers, and the number of nodes in the NN are arbitrary. The machine learning model is generated in advance through machine learning. The recognition unit 20 performs the recognition process by inputting the sensor detection information SEN into the model. The recognition result information RES is output from the model or generated based on the output from the model. Hereinafter, the model included in the recognition model 20 will also be referred to as a "recognition model".

Similarly, the planning unit 30 also includes at least one of a rule-based model and a machine learning model. The planning unit 30 performs the planning process by inputting the recognition result information RES into the model. The target trajectory TRJ is output from the model or generated based on the output from the model. Hereinafter, the model included in the planning unit 30 is also referred to as a "planning model". Hereinafter, the model included in the planning unit 30 will also be referred to as a "planning model".

Similarly, the control amount calculation unit 40 also includes at least one of a rule-based model and a machine learning model. The control amount calculation unit 40 performs the control amount calculation process by inputting the target trajectory TRJ into the model. The control amount CON is output from the model or generated based on the output from the model. Hereinafter, the model included in the control amount calculation unit 40 will also be referred to as a "control amount calculation model".

Two or more of the recognition unit 20, the planning unit 30, and the control amount calculation unit 40 may have an integrated architecture. All of the recognition unit 20, the planning unit 30, and the control amount calculation unit 40 may have an integrated architecture (End-to-End architecture). For example, the recognition unit 20 and the planning unit 30 may have an integrated architecture that generates and outputs the target trajectory TRJ directly from the sensor detection information SEN. Even in the case of the integrated architecture, intermediate products such as the recognition result information RES and the target trajectory TRJ may be output. For example, in a case where the recognition unit 20 and the planning unit 30 have an integrated architecture based on a NN, the recognition result information RES may be an output from an intermediate layer of the NN.

The recognition unit 20, the planning unit 30, and the control amount calculation unit 40 constitute an "automated driving control unit" that controls the automated driving of the vehicle 1. In the present embodiment, a machine learning model is used for at least a part of the automated driving control unit. That is, the automated driving control unit uses a machine learning model as at least one of the recognition model, the planning model, and the control amount calculation model.

Figure 2:
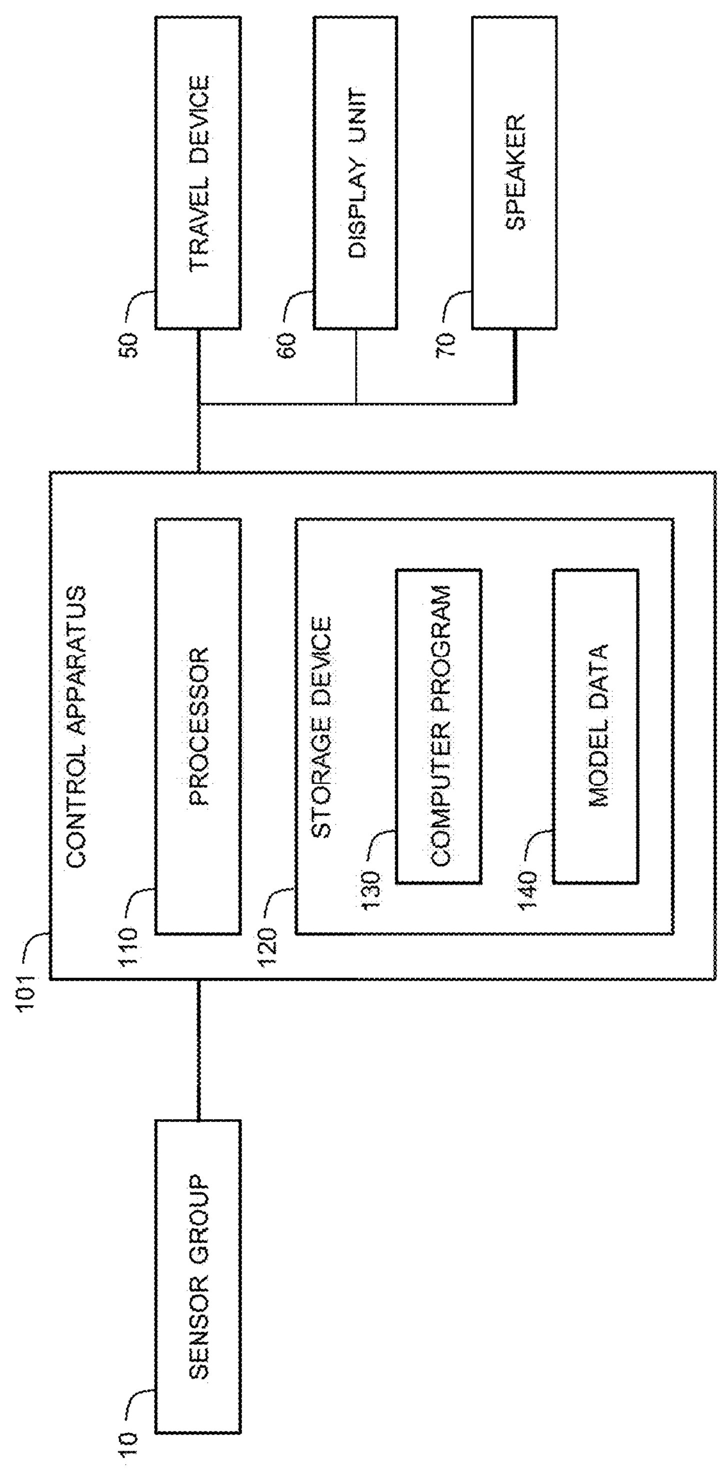
FIG. 2 is a diagram showing an example of a configuration of a control apparatus according to the present embodiment.

FIG. 2 is a block diagram showing an example of a hardware configuration of a control apparatus 101 according to the present embodiment. The control apparatus 101 is installed on the vehicle 1 and at least performs the automated driving control of the vehicle 1. That is, the control apparatus 101 has at least the function of the automated driving control unit described above.

The control apparatus 101 is configured to be able to communicate with the sensor group 10, the travel device 50, a display unit 60, a speaker 70, and an actuator group.

The control apparatus 101 is a computer includes one or more processors 110 (hereinafter, simply referred to as a processor 110 or processing circuitry) and one or more storage devices 120 (hereinafter, simply referred to as a storage device 120).

The processor 110 executes a variety of processing. Examples of the processor 110 include a central processing unit (CPU), a graphics processing unit (GPU), an application specific integrated circuit (ASIC), a field-programmable gate array (FPGA), and the like. The recognition unit 20, the planning unit 30, and the control amount calculation unit 40 may be implemented by a single processor 110 or may be respectively implemented by separate processors 110. The storage device 120 stores a variety of information. Examples of the storage device 120 include a hard disk drive (HDD), a solid-state drive (SSD), a volatile memory, a non-volatile memory, and the likes.

The storage device 120 stores a computer program 130 and model data 140.

A computer program 130 is executed by the processor 110. The variety of processing by the control apparatus 101 may be implemented by a cooperation of the processor 110 executing the computer program 130 and the storage device 120. The computer program 130 may be recorded on a non-transitory computer-readable recording medium.

The model data 140 is data of the recognition model, the planning model, and the control amount calculation model. The processor 110 configures the recognition unit 20, the planning unit 30, and the control amount calculation unit 40 by using the model read from the model data 140 in the execution of the automated driving control. As described above, in the present embodiment, the machine learning model is used as at least one of the recognition model, the planning model, and the control amount calculation model.

The display unit 60 performs various displays. The display unit 60 is configured to be controllable by the control apparatus 101. Examples of the display unit 60 include a meter panel display, a multi-information display, a head-up display, an indicator, and the like.

The speaker 70 emits various sounds. The speaker 70 is configured to be controllable by the control apparatus 101.

In the present embodiment, the vehicle 1 is configured to be drivable by an operator. For example, the vehicle 1 is equipped with a driving operation device (a steering wheel, a gas pedal, a brake pedal, or the like) that receives a driving operation performed by the operator. In this case, the operator is typically a driver boarding the vehicle 1. However, the operator may be a remote operator who remotely operates the vehicle 1. The vehicle 1 may be configured such that the operator can override and drive the vehicle 1 by operating the driving operation device when the automated driving control is performed.

2. Notification Process

As described above, the control apparatus 101 according to the present embodiment performs the automated driving control of the vehicle 1 by using the machine learning model. In the automated driving control, it is required to appropriately determine whether or not the control can be continued normally. On the other hand, the inference result by the machine learning model is calculated based on probabilistic inference based on training data. Therefore, there is a possibility that an error may occur in the inference result, and it may not be appropriate to determine whether or not the control can be continued normally based only on the inference result.

Therefore, in the control apparatus 101 according to the present embodiment, the processor 110 calculates a reliability regarding the inference result by the machine learning model while performing the automated driving control. And the processor 110 is configured to execute a process (hereinafter, referred to as a "notification process") of notifying the operator of the vehicle 1 according to the calculated reliability. The notification process will be described in detail below.

2-1. Reliability

The reliability calculated in the notification process can adopt a confidence score of the machine learning model for the inference result. An example of the reliability calculated in the notification process will be described with reference to FIGS. 3A and 3B.

Figures 3A, 3B:
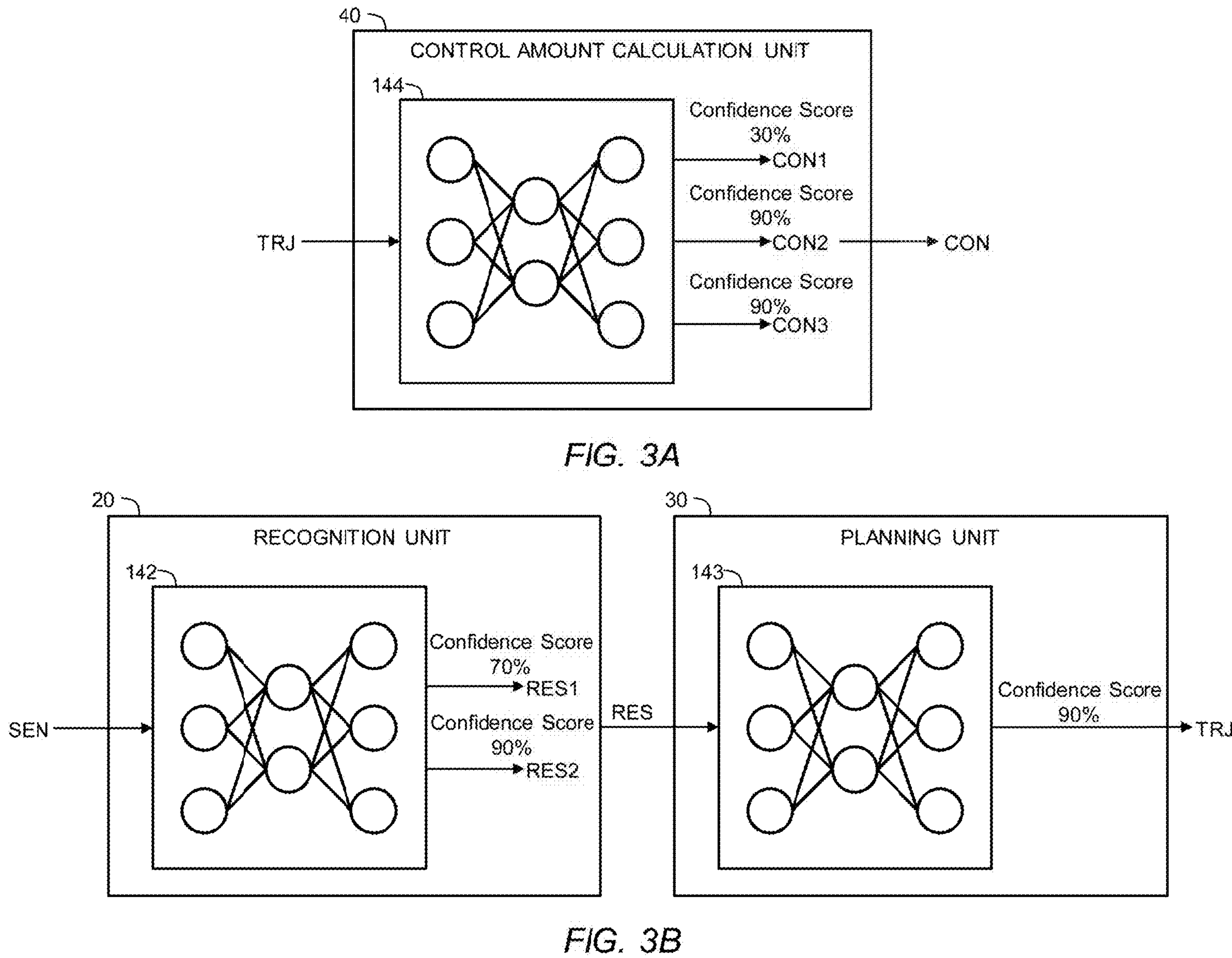
FIG. 3A is a diagram for explaining an example of a reliability calculated in a notification process executed by a processor.
FIG. 3B is a diagram for explaining another example of the reliability calculated in the notification process executed by a processor.

FIG. 3A shows a case where a machine learning model is used as the control amount calculation model 144. In FIG. 3A, the control amount calculation model 144 is configured to receive the target trajectory TRJ as an input and output three control amounts CON1, CON2, and CON3 as inference results. For example, three control amounts CON1, CON2, and CON3 are a steering control amount, a drive control amount, and a braking control amount, respectively. The control amount calculation unit 40 outputs the control amount CON including three control amounts CON1, CON2, and CON3.

In FIG. 3A, the control amount calculation model 144 is further configured to output the confidence scores for each of the three control amounts CON1, CON2, and CON3. At this time, the processor 110 may calculate the reliability regarding the inference result by the control amount calculation model 144 based on each confidence score. For example, the processor 110 calculates the lowest confidence score as the reliability. In this case, in FIG. 3A, the processor 110 calculates the reliability regarding the inference result by the control amount calculation model 144 as 30%. Also, for example, the processor 110 calculates the average value of the confidence scores as the reliability. In this case, in FIG. 3A, the processor 110 calculates the reliability regarding the inference result by the control amount calculation model 144 as 70%.

When the automated driving control unit uses a plurality of machine learning models, the processor 110 may calculate the reliability of all of the plurality of machine learning models in the same manner as described above. Alternatively, the processor 110 may calculate the reliability for each machine learning model as follows.

FIG. 3B shows a case where a machine learning model is used as the recognition model 142 and the planning model 143. In FIG. 3B, the recognition model 142 is configured to receive the sensor detection information SEN as an input and output two pieces of recognition result information RES1 and RES2 as inference results. For example, the two pieces of recognition result information RES1 and RES2 are the recognition result of other vehicles and the recognition result of a white line, respectively. The recognition unit 20 outputs recognition result information RES including the two pieces of recognition result information RES1 and RES2. The planning model 143 is configured to receive the recognition result information RES as an input and output the target trajectory TRJ as an inference result. The planning unit 30 outputs the target trajectory TRJ output from the planning model 143.

In FIG. 3B, the recognition model 142 is further configured to output the confidence score for each of the two recognition result information RES1 and RES2. The planning model 143 is further configured to output the confidence score for the target trajectory TRJ. At this time, the processor 110 may calculate the reliability regarding the inference result by the recognition model 142 and the reliability regarding the inference result by the planning model 143 based on each confidence score. For example, the processor 110 may calculate the reliability regarding the inference result by the recognition model 142 as 70%, and calculate the reliability regarding the inference result by the planning model 143 as 90%.

As described above, the processor 110 is configured to calculate the reliability. As another example of the reliability, when the machine learning model outputs a plurality of inference results, the reliability is calculated using the degree of variation between the plurality of inference results as an indicator. For example, when a machine learning model is used as the planning model, the reliability may be calculated using the variation in time-series between a plurality of target trajectories TRJ to be output as an indicator.

2-2. Processing

Figure 4:
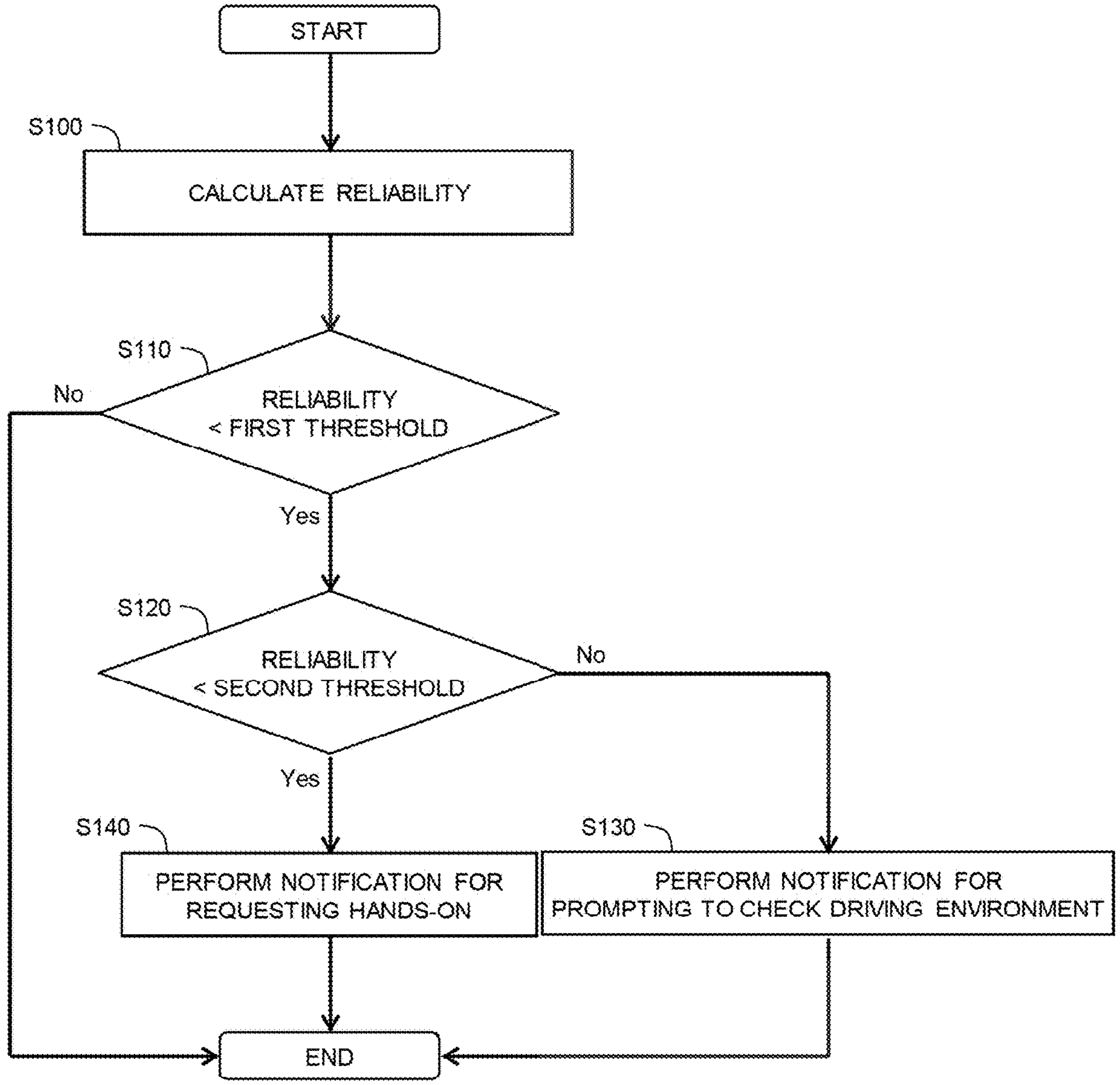
FIG. 4 is a flowchart showing an example of processing executed by the processor in the notification process.

FIG. 4 is a flowchart showing an example of processing executed by the processor 110 in the notification process. The processing according to the flowchart shown in FIG. 4 is repeatedly executed at a predetermined processing cycle while the control apparatus 101 is activated.

First, in step S100, the processor 110 calculates the reliability regarding the inference result by a machine learning model used in the automated driving control unit. For example, as described above, the processor 110 acquires the confidence score for each inference result and calculates the reliability based on the acquired confidence score.

Next, in step S110, the processor 110 determines whether or not the calculated reliability has decreased to be less than a predetermined first threshold. When the reliability is calculated for each machine learning model, the processor 110 may be configured to determine whether any reliability has decreased to be less than the first threshold.

When the reliability is equal to or greater than the first threshold (step S110; No), the processor 110 ends the current process without notifying the operator. When the reliability is decreased to be less than the first threshold (step S110; Yes), the processing proceeds to step S120.

In step S120, the processor 110 determines whether the calculated reliability has decreased to be less than a predetermined second threshold that is smaller than the first threshold. When the reliability is calculated for each machine learning model, the processor 110 may be configured to determine whether any of the reliabilities determined to be less than the first threshold has decreased to be less than the second threshold.

When the reliability is equal to or greater than the second threshold (step S120; No), that is, when the reliability has decreased to be less than the first threshold but has not decreased to be less than the second threshold, the processor 110 performs a notification for prompting the operator to check a driving environment of the vehicle 1 (step S130). The checking the driving environment includes checking of surrounding objects, checking of surrounding traffic situations, checking of a traveling state of the vehicle, checking of a situation of the automated driving control (the travel plan or the target trajectory TRJ), and the like. For example, the processor 110 causes the speaker 70 to output a voice such as "Please check the surroundings of the vehicle and pay attention to traveling by autonomous driving". Also, for example, the processor 110 turns on an indicator indicating that the driver is in a situation where the driver is required to check the driving environment. Also, for example, the processor 110 displays the travel plan or the target trajectory TRJ of the automated driving control on the meter panel display or the multi-information display.

After step S130, the processor 110 ends the current process.

By performing the notification for prompting the driver to check the driving environment, the operator of the vehicle 1 is expected to check the driving environment and monitor whether the automated driving control is normally performed. The operator of the vehicle 1 can prepare for a case where the automated driving control is not normally performed.

When the reliability is less than the second threshold (step S120; Yes), that is, when the reliability has decreased to be less than the first threshold and then further decreased to be less than the second threshold, the processor 110 performs a notification for requesting hands-on to the operator (step S140). The hands-on mentioned here is a state of the operator when driving the vehicle 1, and various states can be considered according to the environment to which the present embodiment is applied. Typically, the hands-on is a state in which the driver sits in the driver's seat and holds the steering wheel. For example, the processor 110 causes the speaker 70 to output a voice such as "Be prepared to immediately perform a driving operation and be careful about traveling by autonomous driving". Also, for example, the processor 110 turns on an indicator indicating that the hands-on is requested. Also, for example, the processor 110 displays a window for warning that the hands-on is requested on the meter panel display or the multi-information display.

After step S140, the processor 110 ends the current process.

When the reliability has decreased to a considerable extent, it is considered that there is a high possibility that the automated driving control is suddenly not normally performed. By performing the notification for requesting the hands-on, the operator of the vehicle 1 is expected to end the automated driving control or override the automated driving control and then immediately start the driving of the vehicle 1 when determining that the automated driving control is not normally performed.

As described above, the control apparatus 101 according to the present embodiment executes the notification process. And the control method according to the present embodiment is implemented by the processor 110 executing the processing in this way. And the control program according to the present embodiment is realized by the computer program 130 that causes the processor 110 to execute the processing in this way.

By the way, the reliability while performing the automated driving control is considered to change more significantly as the traffic situation around the vehicle 1 becomes more complicated. For example, in a situation where there are many objects around the vehicle 1, it is expected that the reliability is likely to change due to frequent object recognition. In such a situation, there is a high possibility that the reliability suddenly changes, so it is desirable to notify the operator early.

Therefore, the processor 110 may be configured to change the first threshold or the second threshold depending on a complexity of a traffic situation around the vehicle 1 in the notification process.

The complexity of the traffic situation may be given using the type of road on which the vehicle is traveling, traffic volume, geographical conditions, and the like as an indicator. For example, when the vehicle 1 is traveling on a highway, the complexity of the traffic situation is assumed to be low. On the other hand, when the vehicle 1 is traveling on a street, the complexity of the traffic situation is assumed to be high. Also, for example, the complexity of the traffic situation is assumed to be higher as the traffic volume around the vehicle 1 is larger. Also, for example, when the weather around the vehicle 1 is fine, the complexity of the traffic situation is assumed to be low. On the other hand, when the weather around the vehicle 1 is rainy, the complexity of the traffic situation is assumed to be high.

The processor 110 may acquire surrounding environment information of the vehicle 1 as an indicator for the complexity. And the processor 110 calculates the complexity of traffic situation around the vehicle 1 based on the acquired surrounding environment information. The processor 110 may acquire the surrounding environment information from, for example, the sensor detection information SEN or the recognition result information RES. The processor 110 may evaluate the complexity of the traffic situation in a stepwise manner or may evaluate the complexity of the traffic situation by a continuous numerical value.

Figure 5:
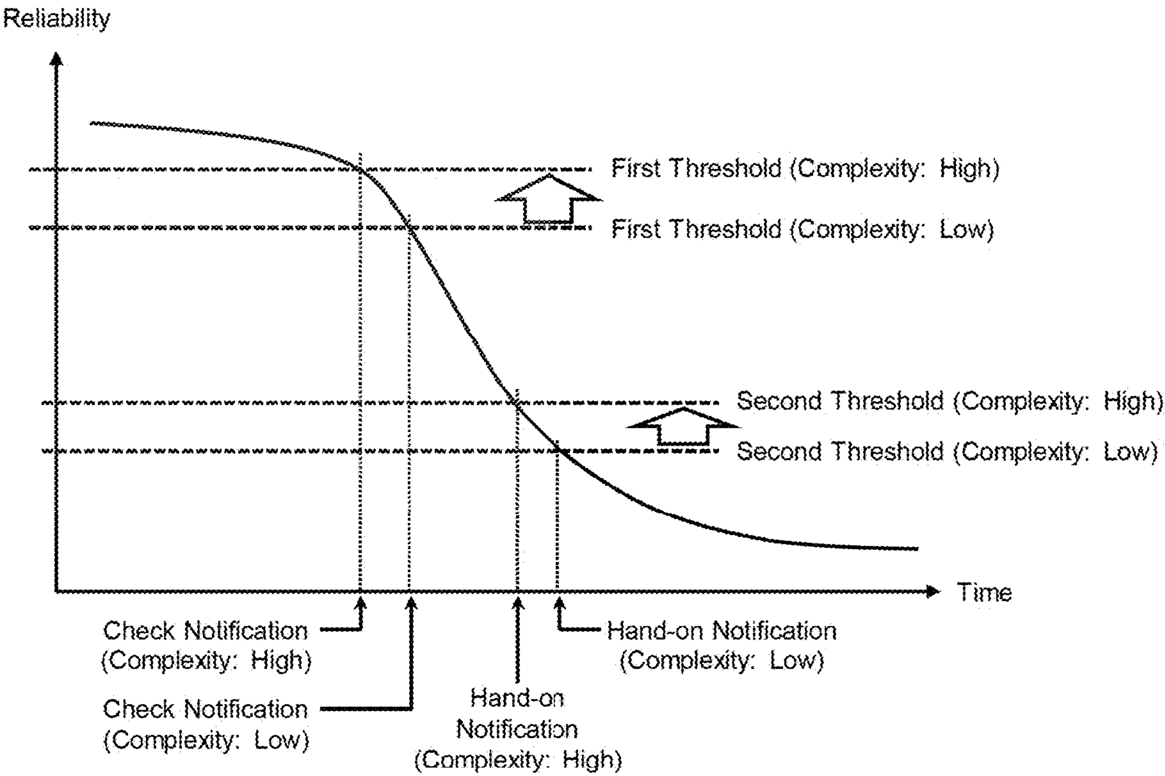
FIG. 5 is a diagram showing a practical example of the control apparatus according to the present embodiment.

When the complexity of the traffic situation is high, the processor 110 changes the first threshold or the second threshold to be larger. FIG. 5 is a diagram showing a practical example in which the first threshold or the second threshold is changed depending on the complexity of the traffic situation. FIG. 5 shows an example of a time change in the reliability. And FIG. 5 shows the change of the first threshold and the second threshold depending on the complexity of the traffic situation. In FIG. 5, the processor 110 changes the first threshold and the second threshold to be larger when the complexity of the traffic situation is high.

As shown in FIG. 5, by changing the first threshold or the second threshold depending on the complexity of the traffic situation, it is possible to advance the timing at which the notification (check notification) for prompting the operator to check the driving environment of the vehicle 1 or the notification (hands-on notification) for requesting hands-on is performed. In this way, in a situation where the reliability is likely to change, it is possible to notify the operator at an early stage.

Additionally, the processor 110 may be configured to change the first threshold or the second threshold depending on the state of the vehicle 1. For example, the processor 110 may change the first threshold or the second threshold to be larger when the speed of the vehicle 1 is high.

2-3. Other Embodiments

As described above, in the notification process, the decrease in the reliability is evaluated in two stages. Then, when the condition (first condition) regarding the first stage is met, the notification for prompting the driver to check the driving environment of the vehicle 1 is performed. And when the condition (second condition) regarding the second stage is met, the notification for requesting hands-on is performed. In the above description, the first condition is that the reliability is less than the first threshold, and the second condition is that the reliability is less than the second threshold which is smaller than the first threshold.

By the way, the automated driving control unit uses a machine learning model as at least one of the recognition model, the planning model, and the control amount calculation model. Especially, in the automated driving control unit, the influence of using the machine learning model as the recognition model and the planning model which are upstream is large. And the processor 110 may calculate the reliability of each of the recognition model and the planning model.

Therefore, when the machine learning model is used as each of the recognition model and the planning model, it is considered that the decrease in the reliability is evaluated in two stages by using the reliability (hereinafter, referred to as a "first reliability") related to the inference result by the recognition model and the reliability (hereinafter, referred to as a "second reliability") related to the inference result by the planning model. From this viewpoint, the notification process may adopt the following embodiment.

Figure 6:
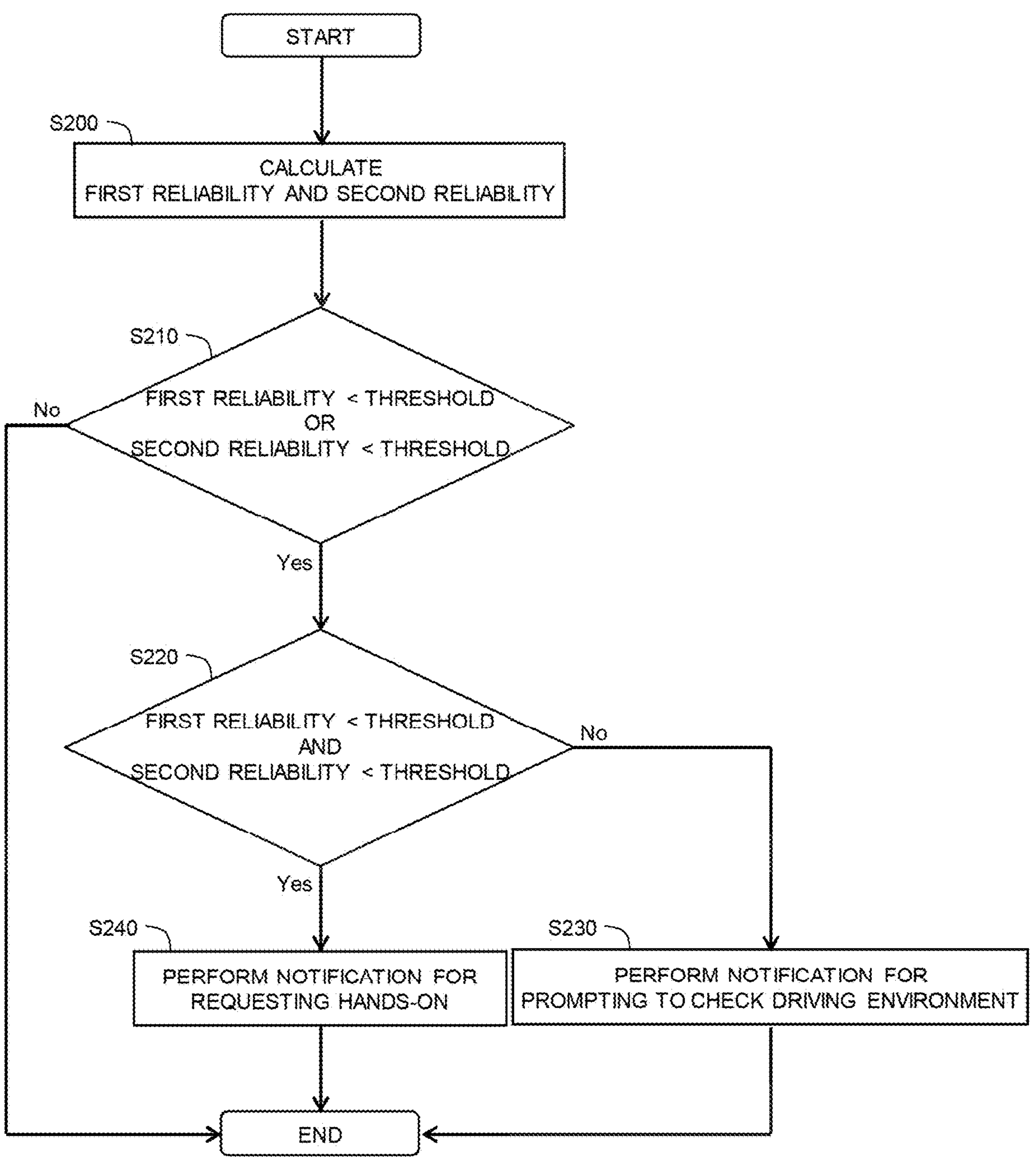
FIG. 6 is a flowchart showing an example of a processing executed by the processor in the notification process according to another embodiment.

FIG. 6 is a flowchart showing an example of processing executed by the processor 110 in the notification process according to another embodiment. The processing according to the flowchart shown in FIG. 6 is repeatedly executed at a predetermined processing cycle while the control apparatus 101 is activated.

First, in step S200, the processor 110 calculates the first reliability and the second reliability.

Next, in step S210, the processor 110 determines whether or not at least one of the first reliability and the second reliability has decreased to be less than a predetermined threshold.

When both the first reliability and the second reliability are equal to or greater than the threshold (step S210; No), the processor 110 ends the current process without notifying the operator. When at least one of the first reliability and the second reliability has decreased to be less than the threshold (step S210; Yes), the processing proceeds to step S220.

In step S220, the processor 110 determines whether or not both the first reliability and the second reliability have decreased to be less than the threshold.

When either one of the first reliability and the second reliability is equal to or greater than the threshold (step S220; No), in other words, when only one of the first reliability and the second reliability has decreased to be less than the threshold, the processor 110 performs the notification for prompting the operator to check the driving environment of the vehicle 1 (step S230).

After step S230, the processor 110 ends the process.

When both the first reliability and the second reliability have decreased to be less than the threshold (step S220; Yes), the processor 110 performs the notification for requesting hands-on to the operator (step S240).

After step S240, the processor 110 ends the process.

As described above, the processor 110 may execute the notification process according to another embodiment. In the notification process according to another embodiment, the first condition is that at least one of the first reliability and the second reliability is less than a predetermined threshold. And the second condition is that both the first reliability and the second reliability are less than the threshold.

3. Effect

As described above, according to the present embodiment, the reliability regarding the inference result by the machine learning model is calculated while performing the automated driving control. Then, the decrease in the reliability is evaluated in two stages. When the reliability satisfies the first condition, the notification for prompting the operator of the vehicle 1 to check the driving environment is performed. And when the reliability satisfies the second condition in addition to the first condition, the notification for requesting hands-on to the operator is performed. By performing the notification for prompting the driver to check the driving environment, it is possible to prompt the operator to check the driving environment and monitor whether the automated driving control is normally performed. In addition, by performing the notification for requesting hands-on, the operator can be made in a state where it is possible to immediately start operation of the vehicle 1 in case it is determined that the automated driving control is not normally performed. In this way, according to the present embodiment, it is possible to effectively monitor and operate the automated driving control using the machine learning model.

What is claimed is:

1. A control apparatus for a vehicle, comprising processing circuitry configured to perform automated driving control of the vehicle by using a machine learning model, wherein the vehicle is configured to be drivable by an operator, and the processing circuitry is further configured to execute:

by the machine learning model, calculating a steering control amount, a driving control amount, and a braking control amount;

by the machine learning model, calculating a first confidence score for the steering control amount, a second confidence score for the driving control amount, and a third confidence score for the braking control amount;

calculating a reliability regarding an inference result by the machine learning model while performing the automated driving control based on the first confidence score, the second confidence score, and the third confidence score;

when a first condition indicating that the reliability has decreased is met, performing notification for prompting the operator to check a driving environment of the vehicle; and when a second condition indicating that the reliability has further decreased in addition to the first condition is met, performing notification for requesting hands-on to the operator.

2. The control apparatus according to claim 1, wherein the first condition is that the reliability is less than a first threshold, and the second condition is that the reliability is less than a second threshold which is smaller than the first threshold.

3. The control apparatus according to claim 2, wherein the processing circuitry is further configured to execute:

acquiring surrounding environment information of the vehicle;

calculating a complexity of a traffic situation around the vehicle based on the surrounding environment information; and changing the first threshold or the second threshold depending on the complexity.

4. The control apparatus according to claim 1, wherein the machine learning model includes a recognition model and a planning model, the recognition model recognizing a situation around the vehicle, the planning model generating a target trajectory of the automated driving control, the reliability includes a first reliability and a second reliability, the first reliability related to the inference result by the recognition model, the second reliability related to the inference result by the planning model, the first condition is that at least one of the first reliability and the second reliability is less than a predetermined threshold, and the second condition is that both the first reliability and the second reliability are less than the predetermined threshold.

5. A control method for a vehicle configured to be drivable by an operator, including:

performing automated driving control of the vehicle by using a machine learning model;

by the machine learning model, calculating a steering control amount, a driving control amount, and a braking control amount;

by the machine learning model, calculating a first confidence score for the steering control amount, a second confidence score for the driving control amount, and a third confidence score for the braking control amount;

calculating a reliability regarding an inference result by the machine learning model while performing the automated driving control based on the first confidence score, the second confidence score, and the third confidence score;

when a first condition indicating that the reliability has decreased is met, performing notification for prompting the operator to check a driving environment of the vehicle; and when a second condition indicating that the reliability has further decreased in addition to the first condition is met, performing notification for requesting hands-on to the operator.

6. A non-transitory computer readable recording medium on which a computer program for controlling a vehicle configured to be drivable by an operator is recorded, the computer program, when executed by a computer, causing the computer to execute:

performing automated driving control of the vehicle by using a machine learning model;

by the machine learning model, calculating a steering control amount, a driving control amount, and a braking control amount;

by the machine learning model, calculating a first confidence score for the steering control amount, a second confidence score for the driving control amount, and a third confidence score for the braking control amount;

calculating a reliability regarding an inference result by the machine learning model while performing the automated driving control based on the first confidence score, the second confidence score, and the third confidence score;

when a first condition indicating that the reliability has decreased is met, performing notification for prompting the operator to check a driving environment of the vehicle; and when a second condition indicating that the reliability has further decreased in addition to the first condition is met, performing notification for requesting hands-on to the operator.

* * * * *